United States Patent
Vosejpka et al.

(10) Patent No.: US 8,999,448 B2
(45) Date of Patent: Apr. 7, 2015

(54) PROCESS FOR PRODUCING CEMENTED AND SKINNED CERAMIC HONEYCOMB STRUCTURES

(75) Inventors: Paul C. Vosejpka, Midland, MI (US); Jun Cai, Midland, MI (US); Ashish Kotnis, Troy, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/124,036

(22) PCT Filed: Jun. 27, 2012

(86) PCT No.: PCT/US2012/044381
§ 371 (c)(1),
(2), (4) Date: Dec. 5, 2013

(87) PCT Pub. No.: WO2013/015932
PCT Pub. Date: Jan. 31, 2013

(65) Prior Publication Data
US 2014/0127412 A1 May 8, 2014

Related U.S. Application Data

(60) Provisional application No. 61/510,811, filed on Jul. 22, 2011.

(51) Int. Cl.
| | | |
|---|---|---|
| B05D 3/02 | (2006.01) | |
| B29D 99/00 | (2010.01) | |
| C04B 41/85 | (2006.01) | |
| C04B 35/626 | (2006.01) | |
| C04B 35/634 | (2006.01) | |
| C04B 35/636 | (2006.01) | |
| C04B 37/00 | (2006.01) | |
| C04B 38/00 | (2006.01) | |
| C04B 41/00 | (2006.01) | |
| C04B 41/50 | (2006.01) | |
| C04B 28/00 | (2006.01) | |
| C04B 28/24 | (2006.01) | |
| B82Y 30/00 | (2011.01) | |
| B01J 35/04 | (2006.01) | |

(52) U.S. Cl.
CPC ............ *B29D 99/0089* (2013.01); *B01J 35/04* (2013.01); *C04B 41/85* (2013.01); *C04B 35/6264* (2013.01); *C04B 35/63424* (2013.01); *C04B 35/63488* (2013.01); *C04B 35/6365* (2013.01); *C04B 37/005* (2013.01); *C04B 38/0019* (2013.01); *C04B 41/009* (2013.01); *C04B 41/508* (2013.01); *C04B 41/5089* (2013.01); *C04B 2235/5228* (2013.01); *C04B 2235/5454* (2013.01); *C04B 2235/9661* (2013.01); *C04B 2237/062* (2013.01); *C04B 2237/064* (2013.01); *C04B 2237/343* (2013.01); *C04B 28/005* (2013.01); *C04B 28/24* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 3,399,080 A | | 8/1968 | Vitkuske |
| 3,404,116 A | | 10/1968 | Pueschner et al. |
| 3,534,829 A | * | 10/1970 | Schneider .................... 181/290 |
| 5,194,154 A | * | 3/1993 | Moyer et al. ............... 210/510.1 |
| 6,117,518 A | * | 9/2000 | Cawse et al. .................. 428/116 |
| 6,720,385 B2 | | 4/2004 | Tabor et al. |
| 6,753,355 B2 | | 6/2004 | Stollmaier et al. |
| 7,275,980 B2 | | 10/2007 | Bonner et al. |
| 2004/0219126 A1 | | 11/2004 | Seto et al. |
| 2005/0037147 A1 | | 2/2005 | Ogunwumi et al. |
| 2005/0109023 A1 | * | 5/2005 | Kudo et al. ..................... 60/311 |
| 2005/0113249 A1 | | 5/2005 | Ziebarth et al. |
| 2006/0057355 A1 | * | 3/2006 | Suzuki et al. .............. 428/308.4 |
| 2009/0286041 A1 | * | 11/2009 | Deneka et al. ................ 428/116 |
| 2010/0112280 A1 | * | 5/2010 | Iwamoto et al. .............. 428/116 |

FOREIGN PATENT DOCUMENTS

| | | |
|---|---|---|
| EP | 1479881 A1 | 11/2004 |
| JP | 2010024073 | 2/2010 |
| WO | 9933125 | 7/1999 |
| WO | 0145828 A1 | 6/2001 |
| WO | 0155237 A1 | 8/2001 |
| WO | 0188007 A1 | 11/2001 |
| WO | 2007078536 A1 | 7/2007 |
| WO | 2008077118 A2 | 6/2008 |
| WO | 2009045731 A2 | 4/2009 |
| WO | 2011082399 A1 | 7/2011 |

OTHER PUBLICATIONS

Reed, J., Principles of Ceramic Processing, Chapters 10-12, John Wiley and Sons, NY, 1988.
Koji, Patent Abstracts of Japan, Japan Patent No. 2010-024073, Feb. 4, 2010, "Honeycomb Structure", (machine translation).

* cited by examiner

*Primary Examiner* — Erma Cameron

(57) ABSTRACT

Organic polymer particles are provided in a cement composition that is used to apply a skin to a ceramic honeycomb, or to bond the ceramic honeycomb to another honeycomb or another material. The presence of the organic polymer particles reduces the penetration of the cement composition through porous walls of the honeycomb. In this way, less blocking of the honeycomb cells is seen, and the reduction in thermal shock performance that is often seen when cement compositions are applied to ceramic honeycombs is reduced.

14 Claims, No Drawings

PROCESS FOR PRODUCING CEMENTED AND SKINNED CERAMIC HONEYCOMB STRUCTURES

This application claims priority from U.S. Provisional Application No. 61/510,811, filed 22 Jul. 2011.

This invention relates to methods for making ceramic honeycomb structures.

Honeycomb structures that have thin-walled, open-ended cells are widely used as filters and as catalyst support applications. They are frequently used to treat combustion gases by filtering out particulates (such as soot particles) and/or aerosol droplets, or as carriers for catalytic materials that catalyze the conversion of certain components of the exhaust (such as $NO_x$ compounds) to benign compounds (such as $N_2$ and $H_2O$). These honeycomb structures are often referred to as "wall flow" devices, because the cell walls are porous and gasses pass through the walls when the structures are in use. The fluids are filtered and/or contact the active catalyst material as they pass through the porous wall(s).

Honeycombs used to treat combustion gases are generally made of a ceramic material, because of the high temperatures that the honeycomb experiences during its use.

Ceramic honeycombs are made in an extrusion process. An extrudable mixture of precursor materials, a liquid (typically water), usually a porogen and one or more binders is extruded through a die to form a green body which has the desired honeycomb structure. The green body is then fired in one or more steps to form the ceramic honeycomb.

Cements are often applied to the honeycomb, primarily for two reasons. Firstly, a ceramic "skin" is usually applied to the periphery of the honeycomb structure. This prevents gasses from escaping out of the sides of the honeycomb. The "skin" is made by firing a cementitious material that includes an inorganic binder and usually some ceramic fibers. Secondly, in some cases, two or more smaller honeycombs are cemented together to form a larger honeycomb structure. This allows larger honeycombs to be constructed from smaller segments that are easier to produce. Another advantage of doing this is segmented honeycombs made in this way are often more resistant to thermal shocks than are monolithic honeycombs. The cement compositions, like the "skin" compositions, include an inorganic binder, and are fired to produce the cement.

During the skin or cement application process, the binders migrate through the pores of the honeycomb structure due to capillary action, and permeate into adjacent cells. When the cementitious composition is fired, binders that have migrated in that way partially or completely block those cells. This causes several problems. There is a higher pressure drop across the blocked or partially blocked cells, and the honeycomb structure as a whole. Therefore, more work is required to force gasses though the filter. In a combustion engine context, this results in a loss of fuel efficiency.

Blocked or partially blocked cells can also decrease the thermal robustness of the filter in several ways. The blocking reduces gas flow through the affected cells, which can produce locally higher or lower temperatures and greater temperature gradients through the filter. Captured soot or other particles become distributed non-uniformly through the filter, due to the blocked or partially blocked cells. Additionally, the elastic modulus of honeycomb substrate becomes locally higher due to the presence of inorganic binder that migrates into it from the cement. This can result in reduced material thermal shock performance at localized portions of the filter. All of these factors can promote mechanical and/or thermal failure.

The blocked or partially blocked cells also reduce the regeneration efficiency because it is harder to develop the necessary regeneration temperatures in the blocked or partially blocked cells.

Therefore, it is desirable to find an economical and effective way to reduce the migration of those binders into the cells of the honeycomb structure.

One way of accomplishing this is to introduce a physical barrier which blocks passage of the binders through the pores of the honeycomb walls. In this approach, a polymeric coating is applied to the surface of the honeycomb structure to which the cement is to be applied. The cement is then applied over the polymeric coating, and the coating is burned off as or before the cement is fired. This approach is effective, but requires several additional processing steps (application and drying of the polymer coating) to be performed, and so increases production costs. A less expensive yet effective approach to preventing binder migration is desired.

This invention is a method for applying a cementitious layer onto a porous ceramic honeycomb structure, comprising the steps of (a) applying a cement composition to at least one porous surface of a ceramic honeycomb containing multiple axially-extending cells defined by intersecting porous walls and (b) firing the honeycomb and cement composition, wherein the cement composition contains at least one inorganic binder, at least one inorganic filler, a carrier fluid and organic polymer particles having a particle size of from about 10 nanometers to 100 microns dispersed in the carrier fluid.

It has been found that the presence of a small amount organic polymer particles in the cement composition very effectively reduces the migration of the inorganic binders through the pores of the honeycomb walls. As a result, less cell blockage occurs, and the problems associated with that blockage are ameliorated. This result is quite surprising, because, unlike previous processes, no polymer layer is applied to the honeycomb and dried before the cement composition is applied. Instead, the presence of the polymer particles in the cement composition is sufficient to reduce the binder migration. The reduced binder migration results in less cell blockage, which in turn leads to smaller pressure drops through the filters and produces smaller temperature gradients within the honeycomb as it is used and/or regenerated. Because binder migration is reduced, little or no increase in the elastic modulus of the underlying honeycomb substrate modulus occurs, and the thermal shock resistance of honeycomb is not significantly compromised.

The ceramic honeycomb is characterized in having multiple cells that extend axially throughout the length of the honeycomb body. The cells are defined by multiple intersecting walls that also extend axially throughout the length of the honeycomb. The walls and the intersection points define the number of cells, as well as their cross-sectional shape and dimensions. A typical honeycomb for many filtration or catalysis applications will contain from 25 to 1000 cells/square inch (about 4 to 150 cells/square centimeter) of cross-sectional area (i.e., transverse to the longitudinal extension of the cells). Wall thicknesses are typically from 0.05 to 10 mm, preferably from 0.2 to 1 mm, although larger or smaller wall thicknesses might be used.

The walls of the ceramic honeycomb are porous. The porosity of the walls may be as low as 5 volume-% or as high as about 90 volume-%. A preferred porosity is at least 25 volume-%, a more preferred porosity is at least 40 volume-% and a still more preferred porosity is at least 50 volume-%. Porosity can be measured by various immersion or mercury porosimetry methods. The volume average pore diameter of the wall pores is at least 5 microns and especially at least 10 microns, up to 50 microns, up to 35 microns or up to 25 microns. "Pore diameter" is expressed for purposes of this invention as an apparent volume average pore diameter as measured by mercury porosimetry (which assumes cylindrical pores).

The ceramic honeycomb may be monolithic (i.e., formed in a single piece), or may be an assembly of smaller honeycombs that are manufactured separately and then assembled together, usually using a ceramic cement. The ceramic cement in such an assembly is in some embodiments a fired cement composition as described herein.

The ceramic honeycomb may be made from an inorganic material such as alumina, zirconia, silicon carbide, silicon nitride, aluminum nitride, silicon oxynitride, silicon carbonitride, mullite, cordierite, beta spodumene, aluminum titanate, a strontium aluminum silicate or a lithium aluminum silicate. In preferred embodiments, at least a portion of the ceramic honeycomb is an acicular mullite. In some embodiments, an acicular mullite honeycomb will contain at least 0.5 weight percent residual fluorine that remains after the decomposition of a fluorotopaz to form the acicular mullite needle structure.

The cement composition contains at least one inorganic binder, at least one inorganic filler, a carrier fluid and organic polymer particles having a size from about 10 nanometers to 100 microns dispersed in the carrier fluid.

Suitable inorganic binders are materials which form a glassy binder phase when the cement composition is fired. Colloidal silica, colloidal alumina or mixtures of colloidal silica and colloidal alumina are among the suitable binders.

The inorganic binder may constitute from 10 to 70%, preferably from 15 to 50% and more preferably from 20 to 40% of the weight of the solids portion of the cement composition. The "solids" in the composition are those inorganic materials that remain after the firing step is completed.

The inorganic filler particles are materials which do not form a binding phase when the cement composition is fired, and thus are distinguished from the inorganic binder component of the cement composition. The inorganic filler particles instead retain their particulate nature throughout the firing process, although they may become bound by the binding phase to other particles or to the inorganic fibers.

The filler particles may be amorphous, partially crystalline or fully crystalline. The inorganic filler particles may contain a crystalline phase that is surrounded by glass. The filler particles may have a coefficient of thermal expansion that closely matches that of the ceramic honeycomb. The filler particles may, for example, have an average coefficient of thermal expansion that differs from that of the ceramic honeycomb by no more than 2 ppm/° C., preferably no more than 1 ppm/° C., over the temperature range of from 200° C. to 600° C. In some embodiments, the filler particles may be the same material as the ceramic honeycomb.

Suitable inorganic filler particles include aluminate, silicate or aluminosilicate materials that may also contain other elements such as rare earths, zirconium, iron, boron and alkaline earths. Examples of aluminate, silicate or aluminosilicate materials that can be used as the inorganic filler particles are alumina, borosilicate glass, quartz, e-glass, s-glass, silicon carbide, silicon nitride, mullite, cordierite, alumina silicates, alumina-zirconia-silicates, strontium aluminum silicates, lithium aluminum silicates, wollastonite, basalt and aluminum titanate.

Other suitable inorganic filler particles include zirconia, silicon carbide, titanium carbide, aluminum carbide, boron carbide, silicon nitride, aluminum nitride, boron nitride, silicon oxynitride, silicon carbonitride, cordierite, beta spodumene, and the like.

The inorganic filler particles may be at least partially in the form of fibers that have a diameter of from 100 nanometers to 20 microns and an aspect ratio (longest dimension divided by shortest dimension) of at least 10, preferably at least 20. A preferred fiber diameter is from 0.5 to 10 microns. A more preferred fiber diameter is from 3 to 10 microns. The number average length of such inorganic fibers may range from 100 microns to 130 millimeters or more. In some embodiments of the invention, essentially all of the fibers have a length of less than 1 mm. In other embodiments, the fibers have a bimodal or multimodal length distribution, in which one portion of the fibers are shorter fibers having a number average length of from 100 to 1000 microns, and at least one other portion of the fibers are longer fibers having a number average length of at least 1 millimeter, preferably from 1 to 100 millimeters, more preferably from 2 to 100 millimeters and even more preferably from 5 to 30 millimeters. In such embodiments, the longer fibers preferably constitute from 1 to 50, more preferably from 3 to 30 and even more preferably from 5 to 25 percent of the total weight of the inorganic fibers.

Examples of useful inorganic fibers include mullite fibers, such as are available from Unifrax; alumina-zirconium-silicate fibers, such as are available from Unifrax; alumina fibers containing up to 10% by weight silica, such as are available from Saffil; γ-alumina and α-alumina+mullite fibers such as Nextel 312 or Nextel 610 fibers from 3M; γ-alumina+mullite+amorphous $SiO_2$ fibers such as Nextel 440 fibers from 3M; γ-alumina+amorphous $SiO_2$ fibers such as Nextel 550 fibers from 3M; quartz fibers such as are available from Saint Gobain; e-glass or s-glass fibers; borosilicate fibers such as are available from Mo—SiC Corporation; basalt fibers such as are available from Albarrie, wollastonite fibers such as are available from Fibertec, and the like.

The inorganic filler particles may instead or in addition include particles that have an aspect ratio of less than 10, preferably less than 2. These inorganic filler particles are different from and do not include the inorganic binder component of the cement composition.

A mixture of inorganic fibers and low aspect ratio inorganic filler particles may be present.

The inorganic filler particles in the aggregate may constitute from about 30 to 90% by weight of the solids in the cement. A preferred amount is from 50 to 85% by weight of the solids and a more preferred amount is from 60 to 80% by weight of the solids. As mentioned before, the "solids" in the composition are those inorganic materials that remain after the firing step is completed. In most cases, the solids will be made up of the inorganic filler particles and the inorganic binder. Carrier fluids and organic materials (including the organic polymer particles) generally are lost from the cement during the firing step(s). The "solids" therefore do not include any amounts of those materials.

The cement composition also includes a carrier liquid. The mixture of carrier fluid and inorganic binder forms a paste or viscous fluid in which the inorganic filler particles and the organic polymer particles are dispersed. The fluid or semi-fluid nature of the cement composition permits it to be applied easily and to adhere well to the underlying honeycomb until the firing step is completed. The carrier liquid may be, for example, water, or an organic liquid in which the inorganic binder(s), inorganic filler particles and organic polymer particles are dispersible. Suitable organic liquids include alcohols, glycols, ketones, ethers, aldehydes, esters, carboxylic acids, carboxylic acid chlorides, amides, amines, nitriles, nitro compounds, sulfides, sulfoxides, sulfones and the like. Hydrocarbons, including aliphatic, unsaturated aliphatic (including alkenes and alkynes) and/or aromatic hydrocarbons, are useful carriers. Preferably, the carrier fluid is an alcohol, water or combination thereof. When an alcohol is used it is preferably methanol, propanol, ethanol or combinations thereof. Water is the most preferred carrier fluid.

The cement composition contains enough of the carrier fluid to wet the binder particles and produce a paste or viscous fluid, in which the inorganic filler particles and the organic polymer particles are dispersed. A useful Brookfield viscosity, as measured at 25° C. using a #6 spindle at 5 rpm, is typically at least about 5, 10, 25, 50, 75 or even 100 Pa·s. The cement composition may exhibit shear-thinning behavior, such that its viscosity becomes lower at higher shear. The total amount of carrier fluid in the cement composition (including any carrier fluid that may be brought in with the binders and/or the organic polymer particles) is generally from about 25% by weight to at most about 90% by weight of the entire composition. A preferred amount of carrier fluid is from 40 to 70% by weight of the entire composition.

The organic polymer particles may constitute from about 0.5 to about 85, preferably about 1 to about 10 and more preferably from 1 to 5 percent of the total weight of the cement composition. The organic polymer particles suitably have a particle size of at least 10 nanometers, preferably at least 25 nanometers. The organic polymer particles are preferably no larger than about 100 microns, and more preferably are not larger than about 10 microns. An especially preferred particle size is from about 25 to 250 nanometers.

The organic polymer particles may be of any organic polymer that is dispersible in the carrier fluid but not soluble therein. The polymer may be non-crosslinked, crosslinked, or branched. Examples of suitable polymers include, for example, polymers and copolymers of acrylic and/or methacrylic esters; polymers of hydroxyalkyl acrylates and/or methacrylates, polymers and copolymers of acrylamide; polymer and copolymers of n-methyloylacrylamides; polymers and copolymers of vinyl aromatic monomers such as styrene, alpha-methylstyrene, ethylstyrene, dimethylstyrene, t-butylstyrene, vinylnaphthalene, methoxystyrene, cyanostyrene, acetylstyrene, monochlorostyrene, dichlorostyrene, other halostyrenes, and the like; polymers and copolymers of acrylonitrile; polymers and copolymers of vinyl acetate; various polyolefins, including the various polyethylenes (such as low density polyethylene (LDPE), linear low density polyethylene (LLDPE), high density polyethylene (HDPE), substantially linear polyethylenes, polypropylene, polybutylene, ethylene-propylene copolymers, ethylene-higher-alpha-olefin copolymers, ethylene-propylene-conjugated diene terpolymers and the like; polymers and copolymers of butadiene; styrene-butadiene copolymers; polyurethanes; polyurethane-ureas; polymers and copolymers of vinyl chloride and/or vinylidene chloride; polymers and copolymers of unsaturated carboxylic acid such as acrylic acid, methacrylic acid, itaconic acid and fumaric acid and the like.

The organic polymer particles are conveniently provided in the form of a latex, i.e., a dispersion in a liquid phase. In such a case, the liquid phase typically will form all or a part of the carrier fluid of the cement composition. The organic polymer particles may be the product of an emulsion polymerization process. Alternatively, the organic polymer particles may be made in a melt dispersion process, or by dispersing powder particles into a liquid phase. A latex suitably contains from about 5 to 70, preferably from 30 to 65, weight percent of dispersed organic polymer particles. A preferred latex has a pH of at least 7, more preferably at least 8, up to about 10, preferably to about 9.5.

Examples of suitable latexes and methods of their preparation are described, in U.S. Pat. Nos. 3,404116, 3,399,080, 6,720,385 and 6,753,355; and WO 01/055237, WO 01/088007, WO08/077118, WO07/078536 and WO 09/045731.

The cement may contain other useful components in addition to the inorganic binder, the inorganic filler particles, organic polymer particles and carrier fluid. An organic binder or plasticizer can provide desirable rheological properties to the cement composition, and therefore preferably is present. The binder is not present in the form of discrete particles and preferably is dissolved in the carrier liquid. Examples of suitable binders and organic plasticizers include cellulose ethers, such as methyl cellulose, ethyl cellulose, hydroxypropylmethyl cellulose, hydroxypropyl cellulose, carboxylmethyl cellulose and the like; polyethylene glycol, fatty acids, fatty acid esters and the like.

Other optional components include dispersants, deflocculants, flocculants, defoamers, lubricants and preservatives, such as those described in Chapters 10-12 of Introduction to the *Principles of Ceramic Processing*, J. Reed, John Wiley and Sons, NY, 1988. The cement composition also may contain one or more porogens. Porogens are materials specifically added to create voids in the skin after being heated to form the amorphous phase. Typically these are particulates that decompose, evaporate or in some way volatilize without melting or forming a film during a heating or firing step to leave a void. Examples include flour, wood flour, carbon particulates (amorphous or graphitic), nut shell flour or combinations thereof.

The cement composition can be prepared by simple mixing of the aforementioned components, in any convenient order.

The cement composition is applied to at least one porous surface of the honeycomb. The manner of applying the cement composition is not critical, and any suitable method by which the composition can be applied at the desired thickness is suitable. The cement can be applied manually or through the use of various types of mechanical apparatus. The cement composition may be applied under sub-atmospheric pressures to facilitate removal of the carrier fluid during the application process.

If the cement composition is used to assemble multiple parts (such as multiple honeycombs) into a larger assembly, the cement is applied in any convenient manner to a surface of one or more of the parts that are being assembled, and the parts are then joined with the cement composition interposed between adjacent surfaces of the parts. Upon firing, dried cement seams form between the parts and adhere them together.

If the cement composition is to be used to form a peripheral skin on the honeycomb (or an assembly containing the honeycomb), the composition is applied to at least a portion of the periphery of the honeycomb. Ceramic honeycombs as manufactured typically have an outer peripheral "skin", which may be simply the exterior cell walls of the peripheral cells of the honeycomb structure. It is generally preferable to remove such a skin before applying a replacement skin in accordance with this invention. At least the exterior walls of the peripheral cells of the honeycomb are removed. More typically, the removal of the "skin" is only part of a more general shaping process, in which outer portions of the ceramic honeycomb are removed to bring its cross-sectional shape and dimensions to necessary specifications. This step of removing peripheral portions from the ceramic honeycomb exposes the interior of the axially-extending cells that remain on the periphery of the honeycomb after the removal step is completed. The cement composition is then applied to at least a portion of the newly exposed periphery of the honeycomb.

The periphery of the honeycomb usually is not smooth, and in most cases a certain proportion of the axially-extending cells around the periphery of the honeycomb will be open before the cement composition is applied to form a skin. The cement composition typically will be applied in such a manner as to fill those open cells and to form a somewhat smooth exterior surface. Therefore, the thickness of the skin usually will vary. At its thinnest points, the applied skin should be at least 1 mm in thickness, and may be as much as 25 mm thick.

The cement composition is fired after it is applied to the honeycomb. The firing step removes the carrier fluid, the organic polymer particles and any other organic materials (including any porogen) from the cement. The inorganic binders form a binding phase during the firing step. The binding phase binds the inorganic particles together, and binds the applied cement layer to the underlying honeycomb structure.

The firing step is performed at a temperature of at least 600° C., and can be performed at any higher temperature below which the honeycomb softens or degrades. The firing temperature may be at least 800° C. A firing temperature in excess of 1500° C. is typically not necessary, and a firing temperature of 1200° C. or less is preferred. In a preferred firing regimen, the honeycomb and applied cement composition are heated at a rate of no greater than 20° C./minute, preferably no greater than 10° C./minute and still more preferably no greater than 5° C./minute, from ambient temperature up to the firing temperature. The gradual heating rate is intended to help prevent thermal shocks and also to provide time for the carrier fluid and any organic materials (including the polymer particles) to be removed. If desired, the assembly may be held at one or more intermediate temperatures or at the maximum for a period. This may be desirable, for example, to remove the carrier fluid, organic polymer particles, organic binders and/or porogens in some predetermined sequence, to allow some chemical reaction to take place, or for some other reason.

An example of a chemical reaction that can occur during the firing step is the production of mullite from components of the cement composition. The formation of mullite requires that one or more sources of silicon and aluminate atoms be present in the cement composition. Colloidal silica and colloidal aluminum are of course sources of silicon and aluminum atoms, respectively. If colloidal silica is used by itself to form the binder phase, the cement composition must contain some additional source of aluminum atoms. This source is typically the inorganic filler particles, which may contain silicon atoms in addition to the necessary aluminum atoms. Similarly, if colloidal alumina is used by itself to form the binder phase, the cement composition must contain some additional source of silicon atoms, which again typically will be the inorganic filler particles. In this second case, the inorganic filler may contain aluminum atoms in addition to the needed silicon atoms. These sources of silicon and aluminum atoms can react to form mullite during the firing step. These source materials may form acicular mullite if heated in the presence of a fluorine source (typically at a temperature of from 600 to 900° C.) to form a fluorotopaz and then further heating to a temperature of at least 900° C., preferably at least 1000° C. and more preferably at least 1100° C., to decompose the fluorotopaz and form the acicular mullite. The fluorine source may be, for example, $SiF_4$, $AlF_3$, HF, $Na_2SiF_6$, NaF, $NH_4F$, a fluorinated polymer such as a fluorinated polyethylene or polytetrafluoroethene, or even residual fluorine contained in an acicular mullite honeycomb, or some mixture of any two or more thereof.

Alternately or in addition, the firing step may be performed simultaneously with some other heat treatment step that is needed in the preparation of the underlying filter and/or the finished part. Acicular mullite honeycombs, for example, tend to contain some residual fluorine. The amount of fluorine may constitute from 0.5 to about 3 weight percent of the weight of the acicular mullite. In conventional processes, this residual fluorine is removed by heating the honeycomb to a temperature of at least 1200° C., preferably at least 1400° C., preferably in air or the presence of oxygen. The firing step of this invention can be performed at the same time as residual fluorine is removed from an acicular mullite honeycomb.

The fired cement preferably has an elastic modulus that is significantly lower than that of the underlying ceramic honeycomb. The elastic modulus of the fired cement may be, for example, in the range of 3 to 35% of that of the ceramic material in the honeycomb. It is believed that this lower modulus helps reduce thermomechanical stress of the honeycomb during regeneration. The modulus of the fired cement can be evaluated by forming 8 mm×4 mm×40 mm test bars from the cement composition, firing the test bars and measuring modulus using a Grindosonic impulse excitation apparatus following ASTM Standard C 1259-98, Standard Test Method for Dynamic Young's Modulus, Shear Modulus, and Poisson's Ratio for Advanced Ceramics by Impulse Excitation of Vibration.

The presence of the organic polymer particles in the cement composition during the firing step reduces the penetration of the cement into the walls of the underlying honeycomb structure. This, in turn, reduces cell blockage, leading to smaller pressure drops through the filters and smaller temperature gradients within the honeycomb as it is used and/or regenerated. The presence of the organic polymer particles in the cement composition also has been found to reduce the losses in thermal shock resistance that are often seen when conventional cement compositions are applied to a ceramic honeycomb and fired.

The mechanism by which the organic polymer particles provide these benefits is not fully understood. Although the invention is not limited to any theory, one explanation is that the organic polymer particles mechanically block the pores in the walls of the honeycomb structure, providing a physical barrier to the penetration of the inorganic binder portion of the cement composition. It is also possible that the organic polymer particles bind to, coat and/or agglomerate some or all of the inorganic binder particles, perhaps due in part to pH effects, and inhibit their mobility and thus their ability to penetrate into the pores of the ceramic honeycomb. The addition of the polymer particles in the form of a latex may increase the viscosity of the cement composition and so retard its penetration into the pores of the honeycomb walls. The organic polymer particles may coagulate and/or form a fugitive film during the application and/or firing steps, which again fully or partially blocks the flow of the cement into the pores. Despite the presence of the organic polymer particles, the cement composition nonetheless retains its ability to effectively form a strong adhesive bond to the honeycomb.

A honeycomb produced in accordance with the invention can be used as a particulate filter, especially for removing particulate matter from power plant (mobile or stationary) exhaust gases. A specific application of this type is a soot filter for an internal combustion engine, especially a diesel engine.

Functional materials can be applied to the honeycomb, before or after applying and firing the cement composition, using various methods. The functional materials may be organic or inorganic. Inorganic functional materials, particularly metals and metal oxides, are of interest as many of these have desirable catalytic properties, function as sorbents or perform some other needed function. One method of introducing a metal or metal oxide onto the composite body is by impregnating the honeycomb with a solution of a salt or acid of the metal, and then heating or otherwise removing the solvent and, if necessary calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the honeycomb with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the honeycomb (the internal walls of which are preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the skinned honeycomb in that manner.

Suitable methods for depositing various inorganic materials onto a honeycomb structure are described, for example, in US 205/0113249 and WO2001045828. These processes are generally in relation to the skinned honeycomb of this invention.

In an especially preferred embodiment, alumina and platinum, alumina and barium or alumina, barium and platinum can be deposited onto the honeycomb in one or more steps to from a filter that is simultaneously capable of removing particulates such as soot, $NO_x$ compounds, carbon monoxide and hydrocarbons from a power plant exhaust, such as from vehicle engines.

The following examples are provided to illustrate the invention, but are not intended to limit the scope thereof. All parts and percentages are by weight unless otherwise indicated.

EXAMPLE 1

Cement Example 1 is prepared as follows: 39.9 parts of ball milled aluminum zirconium silicate fiber (Fiberfrax Long Staple Fine fiber from Unifrax LLC, Niagara Falls, N.Y.), 12.8 parts of colloidal alumina (AL20SD, from Nyacol Nano technologies, Inc., Ashland, Me.) 38.5 parts of water, 1.9 parts of methyl cellulose (Methocel A15LV, available from The Dow Chemical Company), 1.9 parts of polyethylene glycol 400 (from Alfa Aesar, Ward Hill, Mass.) and 5.0 parts of a fine particle size, 45% solids acrylic latex (Neocar 850, from The Dow Chemical Company, pH about 8.5) are mixed to form a uniform mixture. The acrylic latex provides approximately 2.25 parts by weight of dispersed, 70 nm particles of an acrylic polymer to the mixture.

A red food coloring is added to a portion of Cement Example 1. The colored mixture is then coated onto a ceramic honeycomb. The honeycomb is a 10 cell×10 cell×three inches (7.6 cm) acicular mullite having 200 cells per square inch (31 cell/square centimeter). The applied cement layer is allowed to air dry, and the honeycomb is then cut open to inspect the extent to which the cement composition has diffused into the honeycomb structure. Red coloration from the food dye extends into the honeycomb structure a distance equal to approximately one-half the width of a cell.

The pressure drop through another, similar (but uncoated) section of honeycomb is measured, using a 3051 Pressure transmitter (available from Rosemount, Inc., Eden Prairie, Minn.) at a flow rate of 100/min air flow rate. A portion of Cement Example 1 is then coated onto the peripheral surfaces of the same section of honeycomb, and the coated honeycomb is fired at 1100° C. The pressure drop through the coated and fired honeycomb is only 7% higher than that through the uncoated honeycomb.

EXAMPLE 2 AND COMPARATIVE SAMPLE A

Cement Example 2 is prepared as follows: 38.9 parts of ball milled aluminum zirconium silicate fiber (Fiberfrax Long Staple Fine fiber from Unifrax LLC, Niagara Falls, N.Y.), 12.5 parts of colloidal alumina (AL20SD, from Nyacol Nano technologies, Inc., Ashland, Me.) 37.5 parts of water, 1.8 parts of methyl cellulose (Methocel A15LV, available from The Dow Chemical Company), 1.8 parts of polyethylene glycol 400 (from Alfa Aesar, Ward Hill, Mass.) and 7.5 parts of a fine particle size, 45% solids acrylic latex (Neocar 850, from The Dow Chemical Company) are mixed to form a uniform mixture. The acrylic latex provides approximately 3.4 parts by weight of dispersed, 70 nm particles of an acrylic polymer to the mixture.

A red food coloring is added to the mixture. The colored mixture is then coated onto a ceramic honeycomb and air dried as described in Example 1. The honeycomb is then cut open as described in Example 1. There is virtually no penetration of red coloration from the food dye into the honeycomb.

The pressure drop through another honeycomb segment is measured as described in Example 1. The segment is then coated with the cement composition and fired as described in Example 1, and the pressure drop through the coated filter is measured again. The pressure drop through the coated honeycomb is only 2% higher than that through the uncoated honeycomb.

Separately, a portion of Cement Example 2 is used to cement nine 3"×3"×8" (7.6 cm×7.6 cm×22.9 cm) honeycomb segments into a larger square assembly having a square cross-section nine inches (22.9 cm) on a side and a length of eight inches (20.4 cm). These honeycomb segments are of acicular mullite and have 200 cells per square inch (31 cells/cm²). The assembled honeycomb is fired to a temperature of 1100° C. and after cooling to room temperature is machined to produce a cylindrical honeycomb nine inches (22.9 cm) in diameter. More of the Cement Example 2 is applied to the peripheral surface of the machined honeycomb to form a skin. This skin is fired at 1100° C.

The skinned honeycomb structure is then subjected to a thermal bench test in which hot air is passed through the structure to create thermomechanical stress. The hot air is blown through the structure at a rate of 100 standard cubic feet/minute (0.47 m³/second). The air temperature is increased at the rate of 200° C./minute until an air temperature of 700° C. is obtained. Implanted thermocouples measure the temperature of the honeycomb at the peripheral skin and in a channel about 10 mm from the skin, to assess the temperature gradient that is formed in this heating regimen. This temperature difference is 64° C. Similarly, implanted thermocouples measure the temperatures of a seam and in a channel 10 mm from the seam, as a further indication of the temperature gradients that form. This temperature difference is 68° C. The pressure drop through this structure is 107 Pa.

Comparative Cement Sample A is prepared by mixing the following ingredients: 42.0 parts of ball milled aluminum zirconium silicate fiber 13.5 parts of colloidal alumina, 40.5 parts of water, 2.0 parts of methyl cellulose and 2.0 parts of polyethylene glycol 400. Comparative Cement Sample A contains no polymer particles.

A red food coloring is added to a portion of Comparative Cement Sample A, and the colored mixture is then coated onto a ceramic honeycomb and air dried as before. When the honeycomb is then cut open red coloration from the food dye is seen to penetrate into the honeycomb a distance of greater than one cell width. These results when compared with those of Cement Example 2 indicate that the presence of the organic polymer particles very substantially reduces the permeation of the cement binder materials through the porous walls of the honeycomb.

Another similar honeycomb segment is coated with another portion of Comparative Cement Sample A, in the same manner as described for Examples 1 and 2. As before the pressure drop is measured on the uncoated honeycomb segment and the coated segment after firing. The pressure drop through the honeycomb coated with Comparative Cement Sample A is 13% higher than that through the uncoated honeycomb. This result, taken together with the result obtained with Cement Example 2, indicates that the presence of organic polymer particles leads to a significant reduction in pressure drop through the honeycomb structure.

Additional portions of Comparative Cement Sample A are used to form a segmented and skinned honeycomb structure in the same manner as described or Cement Example 2. The resulting skinned honeycomb structure is evaluated on the thermal bench test described above. The temperature gradient between the skin and a channel 10 mm from the skin is 87° C.; and that between a seam and a channel 10 mm from the seam is 139° C. These temperature gradients are much higher than are seen when Cement Example 2 is used to form the seams and skin. The presence of the latex in Cement Example 2 is seen to reduce temperature gradients formed in the segmented and skinned honeycomb structure. The pressure drop through this structure is 116 Pa, or about 8% higher than that of the structure made using Cement Example 2 as the seam and skin material.

EXAMPLE 3 AND COMPARATIVE SAMPLE B

Cement Example 3 is prepared as follows: 40.6 parts of ball milled aluminum zirconium silicate fiber (Fiberfrax Long Staple Fine fiber from Unifrax LLC, Niagara Falls, N.Y.), 13.0 parts of colloidal alumina (Dispal 14N4-80, from Sasol North America, Inc., Houston, Tex.) 39.1 parts of water, 1.9 parts of methyl cellulose (Methocel A15LV, available from The Dow Chemical Company), 1.9 parts of polyethylene glycol 400 (from Alfa Aesar, Ward Hill, Mass.) and 3.5 parts of a fine particle size, 45% solids acrylic latex (Neocar 850, from The Dow Chemical Company) are mixed to form a uniform mixture. The acrylic latex provides approximately 1.6 parts by weight of dispersed, 70 nm particles of an acrylic polymer to the mixture.

A red food coloring is added a portion of Cement Example 3. The colored mixture is then coated onto a ceramic honeycomb and air dried as described in Example 1. The honeycomb is then cut open as described in Example 1. There is virtually no penetration of red coloration from the food dye into the honeycomb.

When another segment of the same honeycomb is coated with Cement Example 3 and fired as described in Example 1, and the pressure drop through the filter increases by only 3% from that of the uncoated honeycomb.

Comparative Cement Sample B is prepared as follows: 42.0 parts of ball milled aluminum zirconium silicate fiber (Fiberfrax Long Staple Fine fiber from Unifrax LLC, Niagara Falls, N.Y.), 13.5 parts of colloidal alumina (Dispal 14N4-80, from Sasol North America, Inc., Houston, Tex.) 40.5 parts of water, 2.0 parts of methyl cellulose (Methocel A15LV, available from The Dow Chemical Company) and 2.0 parts of polyethylene glycol 400 (from Alfa Aesar, Ward Hill, Mass.) are mixed to form a uniform mixture. As before, red food coloring is added a portion of the mixture, and the mixture is then coated onto a ceramic honeycomb and air-dried. The red coloration penetrates into the honeycomb a distance equal to about the width of one cell, which is substantially worse than seen when Cement Example 3 is used to coat the honeycomb.

When another segment of the same honeycomb is coated with Comparative Cement Sample B and fired, the pressure drop through the honeycomb increases by about 10 percent, compared to the uncoated honeycomb.

What is claimed is:

1. A method for applying a cementitious layer onto a porous ceramic honeycomb structure, comprising the steps of (a) applying a cement composition to at least one porous surface of a ceramic honeycomb containing multiple axially-extending cells defined by intersecting porous walls and (b) firing the honeycomb and cement composition, wherein the cement composition comprises at least one inorganic binder, at least one inorganic filler, a carrier fluid and organic polymer particles having a size from about 10 nanometers to 250 nanometers dispersed in the carrier fluid.

2. The method of claim 1, wherein the cement composition contains from 0.5 to 85% by weight of the organic polymer particles.

3. The method of claim 2, wherein the cement composition contains from 1 to 5% by weight of the organic polymer particles.

4. The method of claim 2, wherein the organic polymer particles are provided in the form of a latex.

5. The method of claim 4, wherein the latex is the product of an emulsion polymerization.

6. The method of claim 4, wherein the latex has a pH of at least 7.

7. The method of claim 6, wherein the latex has a pH of from 8 to 9.5.

8. The method of claim 2, wherein the organic polymer particles have a size of at least 25 nanometers.

9. The method of claim 1, wherein the organic polymer particles have a size of 25 to 250 nanometers.

10. The method of claim 1, wherein the inorganic binder includes colloidal silica, colloidal alumina or a mixture thereof.

11. The method of claim 1, wherein the carrier fluid includes water, an alcohol or a mixture thereof.

12. The method of claim 1, wherein the cement layer forms a peripheral skin on the ceramic honeycomb.

13. The method of claim 1, wherein the cement layer adheres a ceramic honeycomb to another ceramic honeycomb.

14. The method of claim 1 wherein the firing step is performed at a temperature of from 800° C. to 1500° C.

* * * * *